S. CARLSON.
SEED CORN TESTER.
APPLICATION FILED NOV. 13, 1912.
1,088,534.
Patented Feb. 24, 1914.
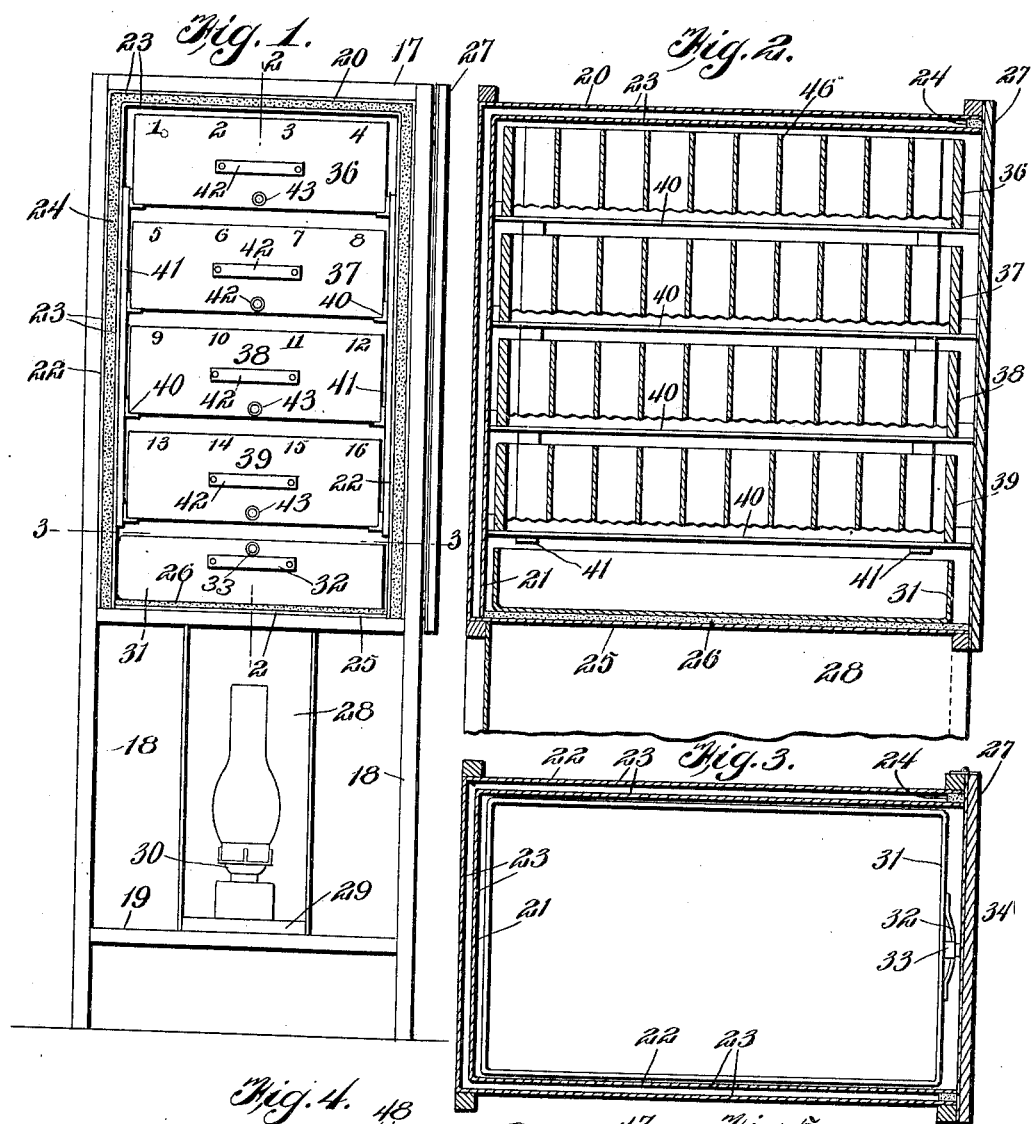
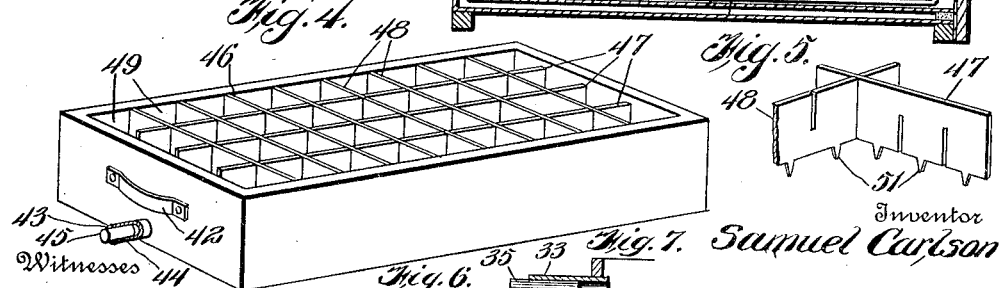
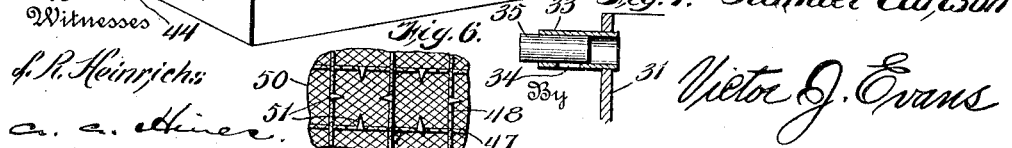

UNITED STATES PATENT OFFICE.

SAMUEL CARLSON, OF ELK POINT, SOUTH DAKOTA.

SEED-CORN TESTER.

1,088,534. Specification of Letters Patent. Patented Feb. 24, 1914.

Application filed November 13, 1912. Serial No. 731,178.

*To all whom it may concern:*

Be it known that I, SAMUEL CARLSON, a citizen of the United States, residing at Elk Point, in the county of Union and State of South Dakota, have invented new and useful Improvements in Seed-Corn Testers, of which the following is a specification.

This invention relates to a seed corn tester, the main object of the invention being to provide a device of this character by which grains removed from numbered or otherwise designated ears of corn may be subjected to germinative tests in correspondingly numbered compartments of a testing apparatus, thus enabling the tests to be carried out with respect to the different individual ears of corn without liability of confusion or mistake.

A further object of the invention is to provide an apparatus of the character described which is simple of construction, convenient, reliable and efficient in action, which is adapted to enable grains from a maximum number of ears of corn to be simultaneously tested, and in which provision is made for enabling the seed grains to be tested by any of the methods in common use.

The invention consists of the features of construction, combination and arrangement of parts hereinafter fully described and claimed, reference being had to the accompanying drawings, in which:—

Figure 1 is a front elevation of a seed corn tester embodying my invention, showing the door of the tester casing thrown open. Fig. 2 is a vertical transverse section through the tester casing on the line 2—2 of Fig. 1. Fig. 3 is a horizontal longitudinal section through the tester casing on the line 3—3 of Fig. 1. Fig. 4 is a perspective detail view of one of the seed trays. Fig. 5 is a detail view of the part of the partition thereof removed. Fig. 6 is a bottom plan view of the same. Fig. 7 is a detail section showing the construction of the water discharge outlet used upon the water pan and seed trays.

The seed corn tester embodies a frame 17 including supporting standards 18 at the outer side thereof and a suitable elevated base or platform 19. Carried by said frame is a casing or chamber having top, back and side walls 20, 21 and 22, each composed of a pair of spaced galvanized metal plates 23, each pair of plates being spaced along their marginal edges by asbestos strips 24, suitably secured thereto and forming a dead air chamber to prevent any sudden or material fluctuations of temperature within the casing. The bottom of the casing consists of a single galvanized metallic plate 25 having a covering of asbestos 26. The front of the casing is adapted to be closed by a hinged door 27 made of wood lined interiorly with galvanized sheet iron and which may be fastened in closed position by any preferred type of fastening means. Arranged below the bottom of the casing is a heating chamber 28 closed on all sides except the front and provided with a base 29 on which rests a lamp or other suitable heater 30 whereby the bottom of the casing may be heated to maintain the interior thereof at a suitable temperature during the operation of testing the seed corn.

Arranged within the bottom of the casing is a water pan 31 which is removable through the front of the casing and provided with a pull handle 32 and a water discharge or drain tube 33 having in its bottom a drain outlet 34 and adapted to be closed by a plug or stopper 35. This pan is designed to be partially filled with water which is heated from the lamp to maintain a moist condition of the internal atmosphere, to facilitate the germination of the seed. The drain tube 33 is located a short distance above the bottom of the pan 31, so that when the pan is filled with water a determined proportion of the water may be discharged, leaving just sufficient amount of water in the bottom of the pan for the succeeding operation. Arranged above the water pan within the casing is a series of seed trays 36, 37, 38 and 39, which rest upon brackets 40 supported by cleats 41 secured to the sides of the casing, the water pan and seed trays being thus readily insertible and withdrawable through the front of the casing. Each tray is provided with a pull handle 42 and a water discharge or drain tube 43 provided in its bottom with an opening 44 and adapted to be closed by a plug 45, whereby the moisture contained within the tray may be conveniently discharged. The water discharge tube 33 of the pan 31 is located at or near the top thereof, while the water discharge tubes of the trays are located near the bottom thereof, as shown, so as to afford greater convenience in the discharge of the water therefrom.

The tester is designed to be used in connection with a rack having spaces or compartments to receive the ears of corn from which samples of grain have been removed for testing purposes, which compartments of the rack are numbered or otherwise suitably designated or differentiated; and it is desirable to provide means whereby the lots of seed under test may be maintained separate, so that the germinative power of the seed or kernels of each ear in the rack may be determined with absolute certainty. For this purpose of holding the lots of seed separate, the trays 36, 37, 38, and 39 are provided with seed receiving compartments equal in number to the receiving spaces or compartments of the rack employed and numbered to correspond thereto.

The compartments of each tray are formed by a removable rack 46 composed of longitudinal and transverse partition plates 47 and 48 slitted for interlocking engagement with each other, and thus forming a series of compartments 49. The bottoms of the compartments of the rack are closed by a bottom wall 50 of woven wire or other mesh material secured in position by tongues 51 on the partition plates which are bent to hold the mesh bottom in place. The rack 46 is of a length somewhat less than that of the tray so that it may be reciprocated back and forth to uniformly distribute the sand, sawdust or other moisture absorbent material employed therein during the testing operation.

In using the apparatus according to the water method of testing, a half inch layer of sand is placed in the bottom of each seed tray and sufficient water poured in to cover the sand, about one-quarter of an inch, after which the compartment racks are placed in the trays mesh side out and reciprocated back and forth until the sand is uniformly distributed and covers the wire meshes. The seed to be tested is then placed in the rack compartments of the trays, in groups of six or more in each compartment according to the arrangement of the ears from which they have been removed in the spaces or compartments of the supporting rack. The trays are then inserted in the tester casing, the door of the latter closed and the seed allowed to remain for a period of about twenty-four hours or until the seed have taken up sufficient moisture, after which the trays are partially withdrawn and the excess moisture discharged through the outlets 44. The trays are then pushed back into the casing, the water pan partially filled, the casing closed and the heater set into operation to heat the interior of the casing until the seed corn has germinated sufficient to indicate the vitality of the ears respectively indicated thereby, which usually requires a period of from three to four days. The defective ears may then be discarded for use as seed corn, the ears which have passed the test removed and stored for use, and the rack refilled and the operation above described again carried out for testing a second lot of corn.

The method above described of testing the seed may be modified according to the moist sand method, in which the sand instead of being covered with water is simply moistened, the seed corn inserted and covered with a second layer of sand and the casing closed and heated for the germinating operation. Instead of sand, sawdust or other suitable material may be employed according to the taste or fancy of the operator.

The advantages of the present invention reside first in the fact that it provides means for testing kernels of seed therefrom in such a manner as to maintain the seed undergoing test in a separated condition and arranged in exact accordance with the arrangement of the supported ears of corn, so that the operator may determine with certainty which ears are fit for use as seed and which are not, and further in the fact that the seed may be tested in accordance with any of the methods commonly employed and in such a manner as to accurately indicate their germinative vitality. Furthermore, the apparatus is simple of construction and may be supplied and operated at a low cost.

A thermometer or other suitable means may be employed to indicate the internal temperature of the tester casing, so that the temperature may be regulated whenever required.

I claim:—

1. A seed corn tester comprising a casing, means for heating the same, and drawers arranged within the said casing and provided with reciprocable partition racks each having a perforate bottom.

2. A seed corn tester comprising a casing, means for heating the same, a water containing pan mounted in the base of the casing, and drawers arranged above the pan, each having a partition rack reciprocably mounted therein and provided with a perforate bottom.

3. A seed corn tester comprising a casing, means for heating the same, a series of drawers removably mounted within the casing, each provided with a drain outlet, a water containing pan mounted in the base of the casing below the series of drawers, and a partition rack reciprocably mounted in each drawer and provided with a perforate bottom.

4. A seed corn tester comprising a casing, means for heating the same, a water containing pan removably mounted in the base of the casing, said pan being provided with a drain outlet at or near the top thereof, a series of drawers removably mounted in the casing above the pan and each provided with a drain outlet at or near the bottom thereof, and a partition rack reciprocably mounted in each drawer and provided with a perforate bottom.

In testimony whereof I affix my signature in presence of two witnesses.

SAMUEL CARLSON.

Witnesses:
W. H. FATE,
M. H. CLEMENTSON.